(12) United States Patent
Tang et al.

(10) Patent No.: US 9,369,970 B2
(45) Date of Patent: Jun. 14, 2016

(54) METHOD AND DEVICE FOR DENOISING IN CHANNEL ESTIMATION, AND CORRESPONDING COMPUTER PROGRAM AND COMPUTER READABLE STORAGE MEDIUM

(75) Inventors: Zhixun Tang, Beijing (CN); Xie Li, Beijing (CN); Liping Zhang, Beijing (CN)

(73) Assignee: ST-ERICSSON SA, Plan-les-Ouates (CH)

( * ) Notice: Subject to any disclaimer, the term of this patent is extended or adjusted under 35 U.S.C. 154(b) by 73 days.

(21) Appl. No.: 14/241,968

(22) PCT Filed: Sep. 14, 2011

(86) PCT No.: PCT/CN2011/079639
§ 371 (c)(1),
(2), (4) Date: Mar. 14, 2014

(87) PCT Pub. No.: WO2013/037112
PCT Pub. Date: Mar. 21, 2013

(65) Prior Publication Data
US 2014/0226587 A1    Aug. 14, 2014

(51) Int. Cl.
*H04W 52/24* (2009.01)
*H04L 25/02* (2006.01)
*H04L 25/03* (2006.01)

(52) U.S. Cl.
CPC ........... *H04W 52/24* (2013.01); *H04L 25/0206* (2013.01); *H04L 25/0216* (2013.01); *H04L 25/0218* (2013.01); *H04L 25/0212* (2013.01); *H04L 2025/03414* (2013.01)

(58) Field of Classification Search
None
See application file for complete search history.

(56) References Cited

U.S. PATENT DOCUMENTS

| | | | |
|---|---|---|---|
| 2003/0035469 A1 | 2/2003 | Frank et al. | |
| 2003/0058962 A1* | 3/2003 | Baldwin | 375/316 |
| 2003/0236074 A1* | 12/2003 | Ishii et al. | 455/69 |
| 2007/0030914 A1 | 2/2007 | Ding et al. | |
| 2008/0310532 A1 | 12/2008 | Baggen et al. | |
| 2010/0002574 A1 | 1/2010 | Kim et al. | |
| 2010/0029262 A1 | 2/2010 | Wang et al. | |
| 2011/0103500 A1* | 5/2011 | Vetterli et al. | 375/260 |
| 2013/0070792 A1* | 3/2013 | Shoaib et al. | 370/542 |

FOREIGN PATENT DOCUMENTS

| | | |
|---|---|---|
| CN | 1469655 A | 1/2004 |
| CN | 1547328 A | 11/2004 |
| CN | 1572061 A | 1/2005 |
| CN | 101494468 A | 7/2008 |
| CN | 101325568 A | 12/2008 |

(Continued)

*Primary Examiner* — Chi H Pham
*Assistant Examiner* — Soon-Dong D Hyun
(74) *Attorney, Agent, or Firm* — Coats & Bennett, PLLC (57) ABSTRACT

The embodiment of the invention discloses a method, device and computer program for denoising in channel estimation. The method comprises steps of: calculating a noise power value and a power value of each path in each user window based on a channel estimation result, the user window is referred to channel impulse response window corresponding to this user; calculating a denoising threshold factor based on the noise power value and the power value of each path in each user window; calculating a denoising threshold value based on the noise power value and the denoising threshold factor; and performing a denoising processing on the channel estimation result by using the denoising threshold value.

15 Claims, 6 Drawing Sheets

(56) References Cited

FOREIGN PATENT DOCUMENTS

| | | | |
|---|---|---|---|
| CN | 101346955 A | 1/2009 | |
| EP | 1968268 A2 | 10/2008 | |
| WO | 2009107071 A2 | 9/2009 | |
| WO | 2013037107 A1 | 3/2013 | |

* cited by examiner

METHOD AND DEVICE FOR DENOISING IN CHANNEL ESTIMATION, AND CORRESPONDING COMPUTER PROGRAM AND COMPUTER READABLE STORAGE MEDIUM

FIELD OF THE INVENTION

This invention relates to communication technology, and more particularly to a method and device for denoising in channel estimation, and corresponding computer program and computer readable storage medium.

BACKGROUND OF THE INVENTION

Even though embodiments of the invention will be described herein in relation to TD-SCDMA (Time Division-Synchronous Code Division Multiple Access) systems, it should be noted that embodiments of the invention may be equally applicable in other scenarios. Thus, the invention is not limited to TD-SCDMA.

TD-SCDMA system is one of standards for the third generation mobile communication system IMT-2000 and is a UMTS (Universal Mobile Telecommunications System) using SCDMA and TDD (Time Division Duplexing).

Currently, a low cost channel estimation method proposed by Steiner B is commonly used in the TD-SCDMA system. See Steiner B, BALER P., Low cost channel estimation in the up-link receiver of CDMA mobile radio systems[J]. Frequenz, 1993, 47 (12):292-298. Main procedures of this method include: a coarse channel estimation is obtained by FFT (Fast Fourier Transformation) and IFFT (Inverse Fast FourierTransformation), an intra-frequency interference cancellation is performed on the coarse channel estimation and a channel estimation result substantially without the intra-frequency interference is obtained, and finally a denoise processing is performed on the channel estimation result to obtain an improved channel estimation result.

According to the conventional methods, the channel estimation performance will be influenced adversely. In some scenarios, a desired result in the channel estimation may be eliminated; and in other scenarios, much noise will be preserved, which are both undesirable situations.

Therefore, the conventional method for denoising in channel estimation needs to be improved.

SUMMARY OF THE INVENTION

According to the conventional methods, when performing the denoise processing on the channel estimation result, an estimated noise power is the only factor in obtaining a denoising threshold for the denoising and in denoising itself. However, by using a single noise canceling threshold related with the noise power, a channel estimation performance will be influenced adversely. If the single noise canceling threshold is set to be high, a desired result in the channel estimation may be eliminated; if the single noise canceling threshold is set to be low, much noise will be preserved, which are both undesirable situations.

In order to solve the above problems, an embodiment of the invention provides a method, a device, a computer program and a computer readable storage medium for denoising in channel estimation, for example for a TD-SCDMA system, which determine a denoising threshold value according to multi-path information of a channel estimation result in conjunction with a useful signal power and a noise power in the channel estimation result so that an adverse influence of the noise on the channel estimation result is reduced effectively and an accuracy of the channel estimation is improved.

In an embodiment of the invention, a first predetermined denoising threshold value and a second predetermined denoising threshold value are set; when the denoising threshold factor is smaller than the first predetermined denoising threshold value, the denoising threshold factor is adjusted to be equivalent to the first predetermined denoising threshold value; when the denoising threshold factor is larger than the second predetermined denoising threshold value, the denoising threshold factor is adjusted to be equivalent to the second predetermined denoising threshold value; and when the denoising threshold factor is larger than or equals to the first predetermined denoising threshold value and is smaller than or equals to the second predetermined denoising threshold value, the denoising threshold factor is kept unchanged. For a high signal-noise ratio, a smaller denoising threshold value may be used since it is sufficient to satisfy requirements of denoising. For a low signal-noise ratio, a larger denoising threshold value may be used since the noise power is higher than the signal power.

Advantages of embodiments of the invention include: the noise power and the signal power are used as factors in a denoising processing during the denoising in channel estimation, which may eliminate the noise interference in the channel estimation result better; information of effective paths in each user window is used to get the signal quality factor and then the denoising threshold factor is set according to the signal quality factor, the denoising threshold value is calculated by using the denoising threshold factor and the noise power value so that the denoising threshold value may be controlled adaptively according to the signal power and the noise power meanwhile useful signals are protected; the performance of the system is further improved especially in a lower signal-noise ratio situation.

Features and advantages of embodiments of the invention are not limited to above. Other features and advantages may be understood by those skilled in the art with reference to the detailed description and the drawings.

BRIEF DESCRIPTION OF THE DRAWINGS

Drawings provide further explanation to embodiments of the invention, which constitute a part of the specification. Drawings exemplify embodiments of the invention and illustrate principles of the embodiments together with the description.

DETAILED DESCRIPTION OF THE PREFERRED EMBODIMENTS

In embodiments of the invention, a noise power value is calculated according to a channel estimation result and a power value of each path in each user window is calculated according to the channel estimation result; a denoising threshold factor is calculated according to the noise power value and the power value of each path in each user window; a noise power value is calculated according to the noise power value and the denoising threshold factor; and finally a denoising processing is performed on the channel estimation result by using the denoising threshold value. Since the noise power and the signal power are used as factors in the denoising processing, a noise interference may be better eliminated from the channel estimation result.

These and other aspects and advantages of the disclosure will become apparent and more readily appreciated from the following descriptions taken in conjunction with the drawings. According to the description and drawings, some specific embodiments are disclosed to illustrate principles of the invention. It would be appreciated by those skilled in the art that changes, alternatives, and modifications all falling into the scope of the claims and their equivalents may be made to the embodiments without departing from spirit and principles of the disclosure.

Figure 1:
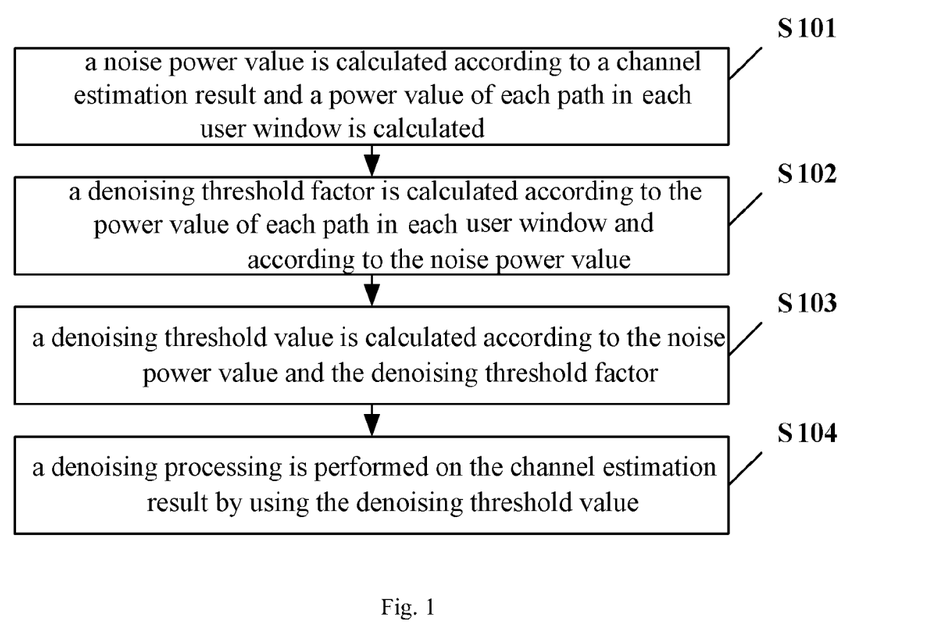
FIG. 1 is a flow chart showing a denoising method in channel estimation according to an embodiment of the invention.

FIG. 1 is a flow chart showing a denoising method in channel estimation according to an embodiment of the invention. The method comprises the following steps:

Step S101, a noise power value is calculated according to a channel estimation result and a power value of each path in each user window is calculated.

In an embodiment of the invention, a coarse channel estimation is obtained by FFT and IFFT, an intra-frequency interference cancellation is performed on the coarse channel estimation and channel estimation result substantially without the intra-frequency interference is obtained, a noise power value is calculated according to the channel estimation result and the power value of each path in each user window is calculated according to the channel estimation result.

In an embodiment of the invention, the noise power value and the power value of each path in each user window may be calculated according to a conventional method, which will not be illustrated in detail here.

In an embodiment of the invention, a user window is referred to channel impulse response window corresponding to this user, for example, in the TD-SCDMA system, an effective length of the Midamble is 128 chips. Assuming all users who belong to the system employs the same time slot and the value of kcell is 8, then the channel impulse response window length W is 16. Based on channel estimations, a value of impulse response of each path within the channel impulse response window can be obtained.

Step S102, a denoising threshold factor is calculated according to the noise power value and the power value of each path in each user window.

After step S102, the denoising threshold factor Thrdpp may be adjusted by using a first predetermined denoising threshold value PP1 and a second predetermined denoising threshold value PP2. The adjustment may be as follows:

When the denoising threshold factor Thrdpp is smaller than the first predetermined denoising threshold value PP1, the denoising threshold factor Thrdpp is adjusted to be equivalent to the first predetermined denoising threshold value PP1; when the denoising threshold factor Thrdpp is larger than the second predetermined denoising threshold value PP2, the denoising threshold factor Thrdpp is adjusted to be equivalent to the second predetermined denoising threshold value PP2; and when the denoising threshold factor Thrdpp is larger than or equals to the first predetermined denoising threshold value PP1 and is smaller than or equals to the second predetermined denoising threshold value PP2, the denoising threshold factor Thrdpp is kept unchanged. For example, the following formula may be used to adjust the denoising threshold factor Thrdpp.

$$\text{Adjusted } Thrd_{PP} = \begin{cases} Thrd_{PP} & PP1 \leq Thrd_{PP} \leq PP2 \\ PP1 & Thrd_{PP} < PP1 \\ PP2 & Thrd_{PP} > PP2 \end{cases}$$

It should be understood that embodiments of the invention are not limited to specific values of the first predetermined denoising threshold value PP1 and the second predetermined denoising threshold value PP2 as above and may be adjusted according to practices.

Step S103, a denoising threshold value is calculated according to the noise power value and the denoising threshold factor.

In an embodiment of the invention, the following formula may be used to calculate the denoising threshold value.

$$Thrd_{DeNoise} = Thrd_{PP} \times \sigma_{ISCP}/x$$

where, $Thrd_{DeNoise}$ represents a denoising threshold value, Thrdpp represents a denoising threshold factor, $\sigma_{ISCP}$ represents a noise power value, x may represent an effective length of Midamble and x=128, for example.

Step S104, a denoising processing is performed on the channel estimation result by using the denoising threshold value.

In an embodiment of the invention, the denoising processing may be performed by comparing the denoising threshold value and a power value of each path of the channel estimation result; if a power value of each path of the channel estimation result is less than or equals to the denoising threshold value, setting this path of the channel estimation result to zero.

Therefore, in an embodiment of the invention, by determining a denoising threshold value according to multi-path information of a channel estimation in conjunction with a useful signal power and a noise power in the channel estimation, an influence of the noise on a channel estimation result is reduced effectively and an accuracy of the channel estimation is improved.

Embodiment 1

In order to help to understand the denoising method in the embodiment of the invention, a denoising process will be introduced with reference to a TD-SCDMA system. It should be understand that the denoising process in the embodiment of the invention may also be used in other TDD systems and will not be illustrated in detail here.

Parameters in the embodiment are listed in Table 1.

TABLE 1

| Communication system | TD-SCDMA |
|---|---|
| Number of cells | 1 |
| Midamble serial number | 0 |
| Modulation mode | QPSK |
| Number of code channels | 16 |
| Serial number of code channels | 1~16 |
| Number of slots | 1 |

Figure 2:
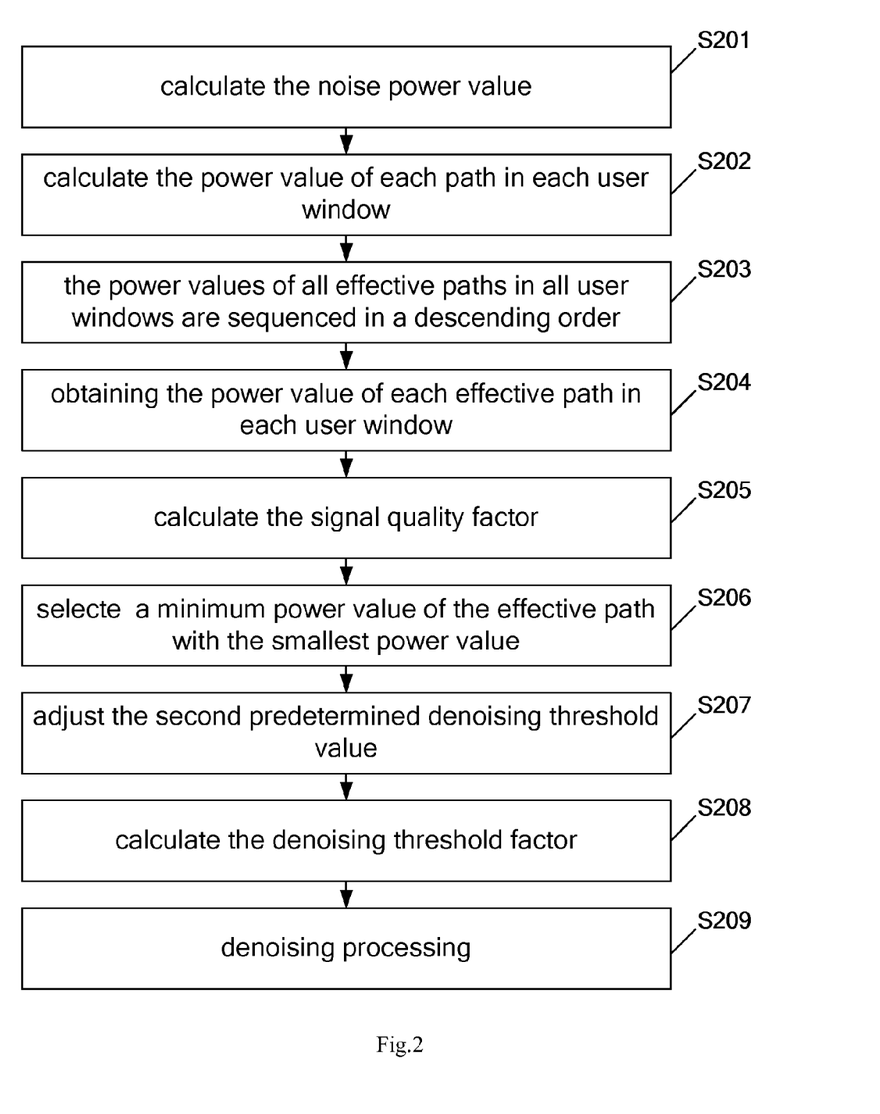
FIG. 2 is a flow chart showing a denoising method in channel estimation according to an embodiment of the invention.

FIG. 2 is a flow chart showing a denoising method in channel estimation according to a more preferable embodiment (i.e., embodiment 1) of the invention. The method comprises the following steps:

Step S201, an intra-frequency interference cancellation is performed on a channel estimation result to get a new channel estimation result and then the noise power value $\sigma_{ISCP}$ is calculated by a noise power estimator.

It should be understood that the intra-frequency interference cancellation in step S201 is an alternative process. The accuracy of the channel estimation may be improved and the accuracy of the noise power value $\sigma_{ISCP}$ may be further improved by performing the intra-frequency interference cancellation on the channel estimation result.

Step S202, an intra-frequency interference cancellation is performed on the channel estimation result to get a new channel estimation result; and a power value of each path in each user window is calculated by using the new channel estimation result.

It should be understood that the intra-frequency interference cancellation in step S202 is an alternative process. The accuracy of the channel estimation may be improved and the accuracy of the power value of each path in each user window may be further improved by performing the intra-frequency interference cancellation on the channel estimation result.

Assuming that channel estimation result after an intra-frequency interference cancellation are $$\underbrace{h_1^{(1)} \ldots h_{16}^{(1)}}_{UserWin1}, \underbrace{h_1^{(2)} \ldots h_{16}^{(2)}}_{UserWin2} \ldots \underbrace{h_1^{(n)} \ldots h_{16}^{(n)}}_{UserWinn},$$

where n represents a serial number of each user window and n=1~8; a power value of each path in each user window is $P_m^{(n)} = 10 \log(h_m^{(n)2})$, where m represents a serial number of each user window and m=1~16.

Step S203, the power values of all effective paths in all user windows are sequenced in a descending order i.e., from large to small:

$$\underbrace{P_{m1}^{(1)} \ldots P_{m16}^{(1)}}_{UserWin1}, \underbrace{P_{m1}^{(2)} \ldots P_{m16}^{(2)}}_{UserWin2} \ldots \underbrace{P_{m1}^{(n)} \ldots P_{m16}^{(n)}}_{UserWinn},$$

where m1 represents a serial number of a maximum path in the user windows and m16 represents a serial number of a minimum path in the user windows.

Step S204, selecting from the power values of all paths in all user windows according to a predetermined strategy and obtaining the power value of each effective path in each user window are carried out.

In an embodiment of the invention, the predetermined strategy may comprise at least one of: a number of effective paths in each user window does not exceed a predetermined number L, where for example L=3 or 4;

$$\underbrace{P_{m1}^{(1)} \ldots P_{mL}^{(1)}}_{UserWin1}, \underbrace{P_{m1}^{(2)} \ldots P_{mL}^{(2)}}_{UserWin2} \ldots \underbrace{P_{m1}^{(n)} \ldots P_{mL}^{(n)}}_{UserWinn};$$

and a difference between the power value of each path in each user window and a maximum power value of each path in each user window does not exceed a predetermined power value, where for example the predetermined power value is 10 dB; $P_{m1}^{(n)} - P_{mk}^{(n)} < 10$ dB. $P_{mk}^{(n)}$ is a minimum power value of effective paths in each user window.

If the above strategy is satisfied, the path is regarded as an effective path of each user window and a list of effective paths is as follows:

$$\underbrace{P_{m1}^{(1)} \ldots P_{min}^{(1)}}_{UserWin1}, \underbrace{P_{m1}^{(2)} \ldots P_{min}^{(2)}}_{UserWin2} \ldots \underbrace{P_{m1}^{(n)} \ldots P_{min}^{(n)}}_{UserWinn},$$

where $P_{min}^{(n)}$ is a minimum power value of each effective path in the $n^{th}$ user window.

It should be understood that in the embodiments of the invention, the predetermined L and the predetermined power value are not limited to specific values.

Step S205, the power value of each effective path in each user window obtained in step S204 are summed up and a useful signal power value is obtained, and then a signal quality factor is calculated according to the useful signal power value and an interference signal code power value ($\sigma_{ISCP}$).

In an embodiment of the invention, the signal quality factor may be calculated according to the following formula: $Qua_{SNR} = \Sigma P_{mi}^{(n)} - \sigma_{ISCP}$, where $Qua_{SNR}$ represents a signal quality factor and $\Sigma P_{mi}^{(n)}$ represents a useful signal power value.

Step S206, a minimum power value of the effective path with the smallest power value is selected from a set of the minimum power values of the effective paths in each user window obtained in Step S205.

For example, the minimum power value of the effective path $H_{minpower}$ with the smallest power value is selected from a set of all available minimum power values of the effective paths in the user window $\{P_{min}^{(1)}, \ldots, P_{min}^{(n)}\}$.

Step S207, the second predetermined denoising threshold value is adjusted by using the signal quality factor calculated in step S205. When the signal quality factor is smaller than a predetermined signal quality factor Qua, the second predetermined denoising threshold value is adjusted to be equivalent to a predetermined threshold value $\sigma_{High}$; and when the signal quality factor is larger than or equals to the predetermined signal quality factor Qua, the second predetermined denoising threshold value is adjusted to be equivalent to a predetermined threshold value $\sigma_{Low}$.

In an embodiment of the invention, the second predetermined denoising threshold value PP2 may be adjusted according to the following formula:

$$\sigma_{High} = 16,$$

$$\sigma_{Low} = 8.$$

$$PP2 = \begin{cases} \sigma_{High}, & Qua_{SNR} < Qua \\ \sigma_{Low}, & Qua_{SNR} \geq Qua \end{cases}$$

where Qua is a standard value for a predetermined signal quality factor. For example, Qua=−5 dB.

It should be understood that in the embodiments of the invention, $\sigma_{High}$, $\sigma_{Low}$ and Qua are not limited to specific values.

Step S208, the denoising threshold factor is calculated according to the minimum power value of each path in each user window and the noise power value $\sigma_{ISCP}$.

In an embodiment of the invention, the denoising threshold factor Thrdpp may be calculated according to the following formula:

$$Thrd_{PP} = H_{minpower} \times \frac{x}{\sigma_{ISCP}} - \Delta$$

where, $H_{minpower}$ represents a minimum power value of each effective path, Δ represents a protection factor, x may represent an effective length of Midamble and x=128, for example.

Δ guarantees that during the denoising processing, the effective path corresponding to the minimum power value $H_{minpower}$ in each user window would not be deleted.

Further, the denoising threshold factor Thrdpp may be adjusted according to the first predetermined denoising threshold value PP1 and the second predetermined denoising threshold value PP2.

For example, the denoising threshold factor Thrdpp may be adjusted according to the following formula:

$$Thrd_{PP} = \begin{cases} Thrd_{PP} & PP1 \leq Thrd_{PP} \leq PP2 \\ PP1 & Thrd_{PP} < PP1 \\ PP2 & Thrd_{PP} > PP2 \end{cases}$$

In an embodiment of the invention, the first predetermined denoising threshold value PP1=4 and the second predetermined denoising threshold value PP2=16 ($Qua_{SNR}$<Qua). It should be understood that the first predetermined denoising threshold value PP1 and the second predetermined denoising threshold value PP2 are not limited to the specific values.

Step S209, the denoising threshold value is calculated according to the noise power value and the denoising threshold factor, and then the denoising processing is performed on the channel estimation result by using the denoising threshold value.

In an embodiment of the invention, in order to reduce the interference of the noise, the denoising threshold factor Thrdpp and the noise power value $\sigma_{ISCP}$ are used to get the denoising threshold value $Thrd_{DeNoise}$ according to the following formula:

$$Thrd_{DeNoise} = Thrd_{PP} \times \sigma_{ISCP}/x.$$

where, x may represent an effective length of Midamble and x=128, for example.

When a power value of a path of the channel estimation result is smaller than the threshold, this path of the channel estimation result is set to zero.

Information of effective paths in the user window is used to get the signal quality factor and then the denoising threshold factor is set according to the signal quality factor, the denoising threshold value is calculated by using the denoising threshold factor and the noise power value so that the denoising threshold value may be controlled adaptively according to the signal power and the noise power meanwhile useful signals are protected.

Features described with reference to one embodiment and/or example may exist in one or more embodiments and the existence or addition of one or more other features, components, steps or their combination may also apply to the embodiments.

Advantages of the denoising processing according to an embodiment of the invention will be described using simulation results of the TD-SCDMA system. Detailed simulation parameters are from 3GPP 25.102. Important simulation parameters are listed as follows:

| Simulation service | 12.2K | 12.2K |
|---|---|---|
| Number of cells | 1 | 1 |
| Midamble serial number | 0 | 0 |
| Modulation mode | QPSK | QPSK |

-continued

| Simulation service | 12.2K | 12.2K |
|---|---|---|
| Frequency spreading factor | 16 | 16 |
| Kcell | 8 | 8 |
| Number of slots | 1 | 1 |
| Serial number of useful signal codes | 1, 2 | 1, 2 |
| Serial number of interference signal codes | 3, 4, . . . , 10 | none |
| Useful signal power/interference signal power | 1 | none |
| Fading channel | AWGN, Case3 | AWGN |

Figure 3:
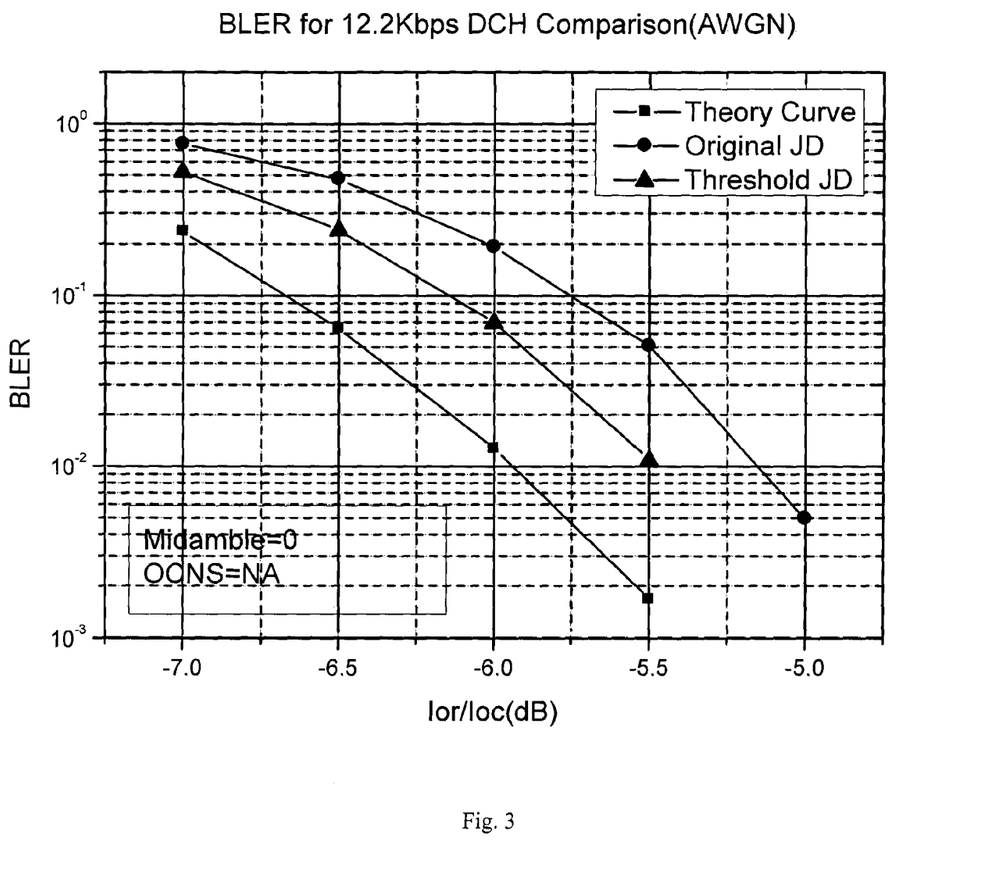
FIG. 3 is a schematic diagram showing a simulation result according to an embodiment of the invention.
Figure 4:
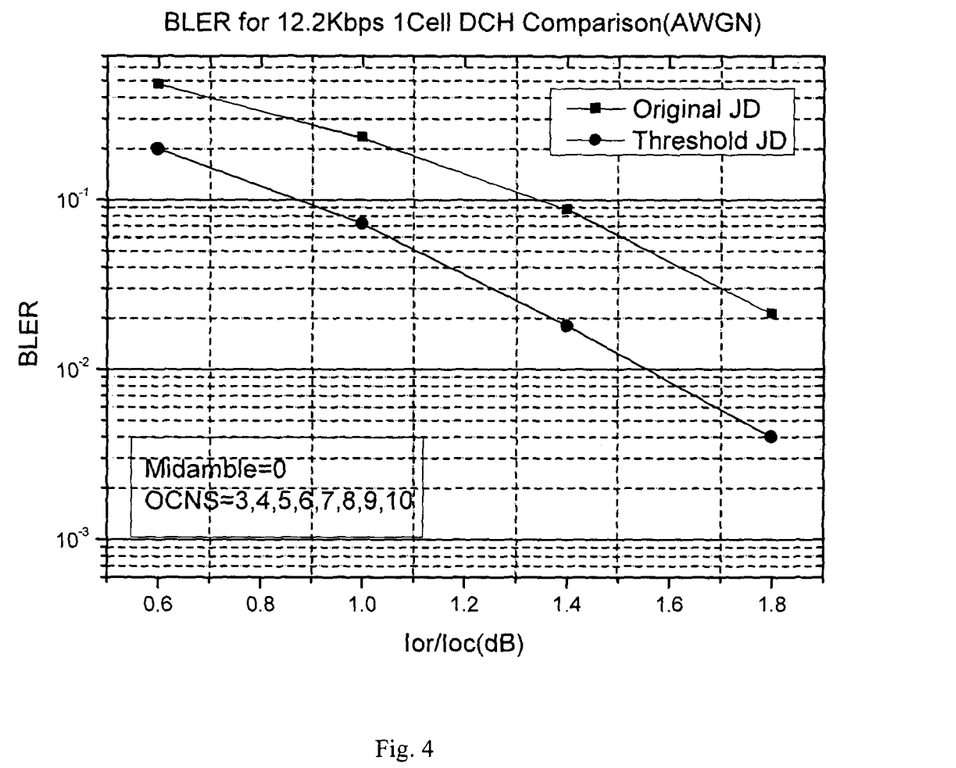
FIG. 4 is a schematic diagram showing a simulation result according to an embodiment of the invention.
Figure 5:
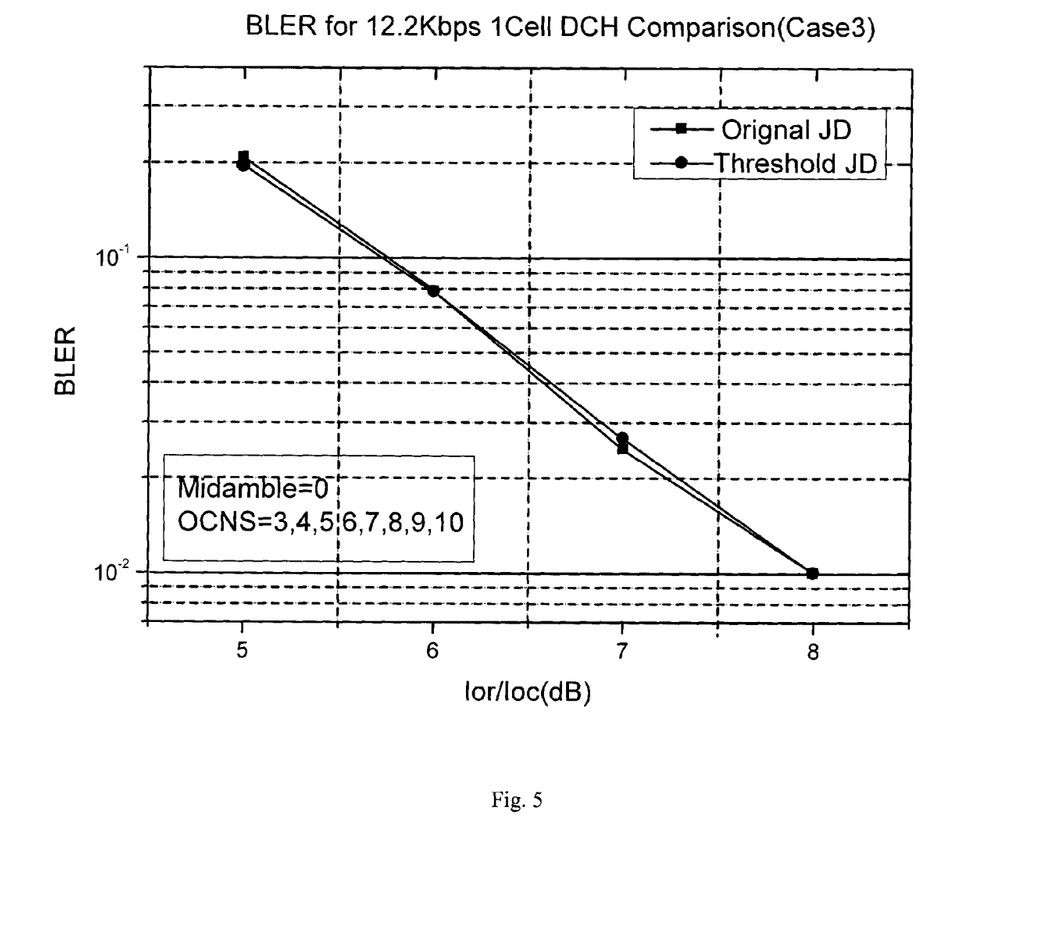
FIG. 5 is a schematic diagram showing a simulation result according to an embodiment of the invention.

Under the above simulation configuration and channel environment, simulation results are shown in FIG. 3 to FIG. 5. The denoising based on an embodiment of the invention achieves better performance than conventional algorithms by using less complex algorithm. In the figures, Original JD refers to a conventional denoising and Threshold JD refers to the denoising according to an embodiment of the invention. As shown in FIG. 3, when BLER=0.01, the denoising method according to an embodiment of the invention is better than the conventional denoising method by about 0.5 dB.

Processes or methods described by flowcharts or other forms may be understood as including modules, segments or components realizing codes of executable instructions of specific logic functions or processes; a scope of embodiments of the invention may includes other forms of realization, which may be in a sequence different from the discussed, including a similar sequence or a reverse sequence of realizing functions, which should be understood by those skilled in the art.

Logics and/or functions described in flow charts or other forms (for example sequence forms realizing executable instructions of logic functions) may be embodied in any computer readable medium for using by instruction execution system, apparatus or device (for example system based on computers, including processor system or systems may obtain instructions from instruction execution system, apparatus or device) or for using in connection with these instruction execution system, apparatus or device. In the specification, "computer readable medium" may be any apparatuses including, storing, communicating, transmitting or propagating programs for using by instruction execution system, apparatus or device or for using in connection with these instruction execution system, apparatus or device. Specific examples (non-exhausting sequence forms) of computer readable medium include: electric connecting components having one or more wires (electronic device), portable computer disk cassette (magnetic device), random access memory (RAM), readable optical memory (ROM), erasable programmable read only memory (EPROM or flash memory), fiber device and portable CD read only memory (CDROM). In addition, computer readable medium may even be paper or other medium on which programs may be printed since the paper or other medium may be scanned, edited, decoded or processed by other ways when needed to obtain the program electronically and then stored in the computer memory.

Figure 6:
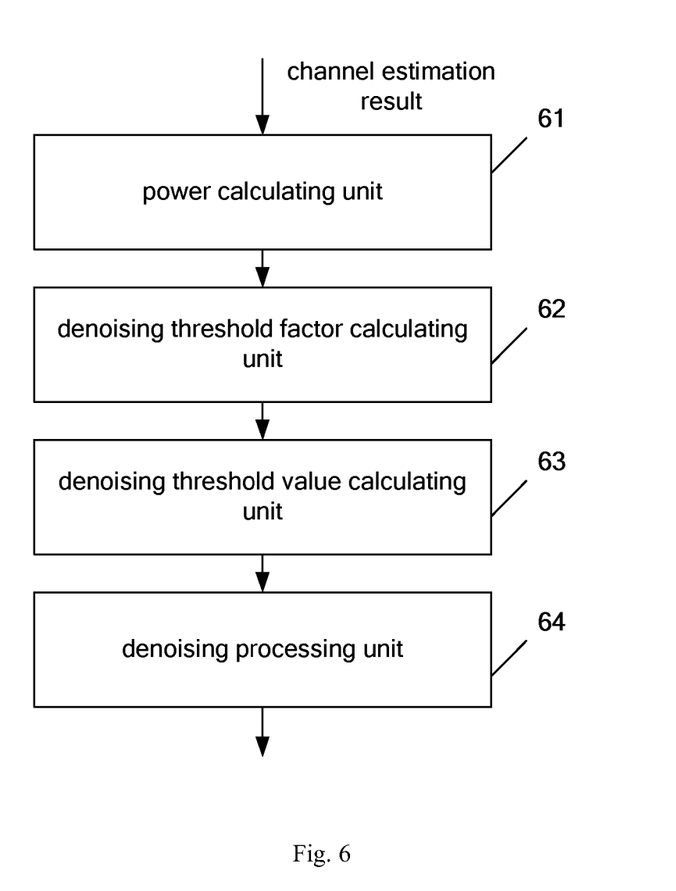
FIG. 6 is a block diagram showing a denoising device in channel estimation according to an embodiment of the invention.

FIG. 6 is a block diagram showing a denoising device in channel estimation according to an embodiment of the invention. As shown in FIG. 6, the denoising device comprises: a power calculating unit 61, for calculating a noise power value and a power value of each path in a user window according to a channel estimation result; a denoising threshold factor calculating unit 62, for calculating a denoising threshold factor according to the noise power value and the power value of each path in the user window; a denoising threshold value calculating unit 63, for calculating a denoising threshold value according to the noise power value and the denoising threshold factor; and a denoising processing unit 64, for performing a denoising processing on the channel estimation result by using the denoising threshold value.

In an embodiment of the invention, the power calculating unit 61 includes at least one sub-unit, for performing an intra-frequency interference cancellation on the channel estimation result to get a new channel estimation result; and calculating the noise power value and the power value of each path in the user window by using the new channel estimation result.

In an embodiment of the invention, the denoising threshold factor calculating unit 62 includes at least one sub-unit, for selecting a minimum power value $H_{minpower}$ of each effective path in the user window with the smallest power value from the power value of each path in the user window; and calculating the denoising threshold factor by using the minimum power value $H_{minpower}$ and the noise power value.

In an embodiment of the invention, the denoising processing unit 64 includes at least one sub-unit, for comparing a power value of a path of the channel estimation result and the channel estimation result; and if a power value of a path of the channel estimation result is smaller than or equals to the denoising threshold value, setting this path of the channel estimation result to zero.

In an embodiment of the invention, a computer program for denoising processing in channel estimation is provided. When the computer program is executed, the computer program enables a computer performs steps of: a power calculating step, for calculating a noise power value according to a channel estimation result and for calculating a power value of each path in each user window; a denoising threshold factor calculating step, for calculating a denoising threshold factor according to the noise power value and the power value of each path in the user window; a denoising threshold value calculating step, for calculating a denoising threshold value according to the noise power value and the denoising threshold factor; and a denoising processing step, for performing a denoising processing on the channel estimation result by using the denoising threshold value.

In an embodiment of the invention, a computer readable storage medium, for storing a computer program for denoising processing in channel estimation, is provided. When the computer program is executed, the computer program makes a computer performs steps of: a power calculating step, for calculating a noise power value according to a channel estimation result and for calculating a power value of each path in each user window; a denoising threshold factor calculating step, for calculating a denoising threshold factor according to the noise power value and the power value of each path in the user window; a denoising threshold value calculating step, for calculating a denoising threshold value according to the noise power value and the denoising threshold factor; and a denoising processing step, for performing a denoising processing on the channel estimation result by using the denoising threshold value.

Embodiments of the invention have the following advantages.

The noise power and the signal power are used as factors in a denoising processing during the denoising process in channel estimation, which may eliminate the noise interference on the channel estimation result better; information of effective paths in the user window is used to get the signal quality factor and then the denoising threshold factor is set according to the signal quality factor, the denoising threshold value is calculated by using the denoising threshold factor and the noise power value so that the denoising threshold value may be controlled adaptively according to the signal power and the noise power meantime useful signals are protected; the procedure of denoising is less complex than before and a performance of the system is further improved especially in a lower signal-noise ratio situation.

Features and advantages of embodiments of the invention are not limited to the above. Other features and advantages may be understood by those skilled in the art with reference to the detailed description and the drawings.

It should be noted that the invention may be realized by hardware, firmware or their combination. In the above embodiments, each step or method may be realized by software or firmware stored in the memory and executed by proper instruction execution system. For example, if realized by hardware, it may be realized by any one of the following techniques or their combinations known in the art: ASICs having proper combination of logical gate circuits, PGA and FPGA, etc.

Different features of the invention are shown above and with reference to drawings. It should be understood that those skilled in the art may prepare proper computer codes to realize each step and procedure described above and shown in figures. It should be also understood that the above terminals, computers, servers and networks may be of any type and the computer codes may be prepared according to the disclosed contents so as to use the device to realize the invention.

What is claimed is:

1. A method of denoising in channel estimation, the method comprising:
   calculating a noise power value and a second power value of each path in each user window based on a channel estimation result, wherein the user window comprises a channel impulse response window corresponding to the user;
   calculating a denoising threshold factor using the noise power value and the second power value of each path in each user window;
   calculating a denoising threshold value using the noise power value and the denoising threshold factor; and
   performing denoising processing on the channel estimation result using the denoising threshold value.

2. The method according to claim 1, wherein processing the channel estimation result comprises:
   comparing the denoising threshold value and a power value of each path of the channel estimation result; and
   if the power value of a path of the channel estimation result is smaller than or equal to the denoising threshold value, setting this path of the channel estimation result to zero.

3. The method according to claim 1, wherein calculating the noise power and the second power value comprises:
   performing an intra-frequency interference cancellation on the channel estimation result to get a new channel estimation result; and
   calculating the noise power value and the second power value of each path in each user window using the new channel estimation result.

4. The method according to claim 3, wherein calculating the denoising threshold factor comprises:
   selecting a minimum power value $H_{minpower}$ of each effective path in each user window from the second power value of each path in each user window; and
   calculating the denoising threshold factor using the minimum power value $H_{minpower}$ and the noise power value.

5. The method according to claim 4, wherein calculating the denoising threshold factor comprises:
calculating the denoising threshold factor according to:

$$Thrd_{PP} = H_{minpower} \times \frac{x}{\sigma_{ISCP}} - \Delta,$$

where $Thrd_{pp}$ represents the denoising threshold factor, $H_{minpower}$ represents the minimum power value of each effective path, $\Delta$ represents a protection factor, $\sigma_{ISCP}$ represents the noise power value, x represents an effective length of Midamble, and x=128.

6. The method according to claim 4, wherein selecting the minimum power value $H_{minpower}$ comprises:
selecting from the second power value of each path in each user window according to a predetermined strategy to obtain a fourth power value of each effective path in each user window; and
selecting the minimum power value $H_{minpower}$ of each effective path in each user window from the fourth power value of each effective path in each user window.

7. The method according to claim 6, wherein before selecting the minimum power value $H_{minpower}$, calculating the denoising threshold factor further comprises sequencing the fourth power value of each effective path in each user window in a descending order.

8. The method according to claim 6, wherein the predetermined strategy comprises at least one of:
a number of effective paths in each user window does not exceed a predetermined number; and
a difference between the second power value of each path in each user window and a maximum power value of each path in each user window does not exceed a predetermined power value.

9. The method according to claim 4, further comprising:
when the denoising threshold factor is smaller than the first predetermined denoising threshold value, adjusting the denoising threshold factor to be equivalent to the first predetermined denoising threshold value;
when the denoising threshold factor is larger than the second predetermined denoising threshold value, adjusting the denoising threshold factor to be equivalent to the second predetermined denoising threshold value; and
when the denoising threshold factor is larger than or equal to the first predetermined denoising threshold value and is smaller than or equal to the second predetermined denoising threshold value, keeping the denoising threshold factor unchanged.

10. The method according to claim 9, wherein calculating the denoising threshold factor further comprises:
summing up the fourth power values of each effective path in each user window to obtain a useful signal power value;
calculating a signal quality factor according to the useful signal power value and an interference signal code power value; and
adjusting the second predetermined denoising threshold value using the signal quality factor, wherein:
when the signal quality factor is smaller than a predetermined signal quality factor Qua, adjusting the second predetermined denoising threshold value to be equivalent to a high predetermined threshold value $\sigma_{High}$; and
when the signal quality factor is larger than or equal to the predetermined signal quality factor Qua, adjusting the second predetermined denoising threshold value to be equivalent to a low predetermined threshold value $\sigma_{Low}$.

11. An apparatus configured to denoise in channel estimation, comprising:
a power calculating circuit configured to calculate a noise power value and a second power value of each path in each user window based on a channel estimation result, wherein the user window comprises a channel impulse response window corresponding to this user;
a denoising threshold factor calculating circuit configured to calculate a denoising threshold factor using the noise power value and the second power value of each path in each user window;
a denoising threshold value calculating circuit configured to calculate a denoising threshold value using the noise power value and the denoising threshold factor; and
a denoising processing circuit configured to perform a denoising processing on the channel estimation result using the denoising threshold value.

12. The apparatus according to claim 11, wherein the power calculating circuit comprises at least one sub-circuit configured to:
perform an intra-frequency interference cancellation on the channel estimation result to get a new channel estimation result; and
calculate the noise power value and the second power value of each path in each user window using the new channel estimation result.

13. The apparatus according to claim 11, wherein the denoising threshold factor calculating circuit comprises at least one sub-circuit configured to:
select a minimum power value $H_{minpower}$ of each effective path in each user window from the power value of each path in each user window; and
calculate the denoising threshold factor by using the minimum power value $H_{minpower}$ and the noise power value.

14. The apparatus according to claim 11, wherein the denoising processing circuit comprises at least one sub-circuit configured to:
compare the denoising threshold value and a power value of each path of the channel estimation result; and
if the power value of a path of the channel estimation result is smaller than or equal to the denoising threshold value, set this path of the channel estimation result to zero.

15. A computer program product stored in a non-transitory computer readable medium for denoising in channel estimation, the computer program product comprising software instructions which, when executed in a computer enable the computer to:
calculate a noise power value based on a channel estimation result and to calculate a second power value of each path in each user window, wherein the user window comprises a channel impulse response window corresponding to this user;
calculate a denoising threshold factor using the second power value of each path in each user window and the noise power value;
calculate a denoising threshold value using the noise power value and the denoising threshold factor; and
perform a denoising processing on the channel estimation result using the denoising threshold value.

* * * * *